3,161,568
PARENTERAL SOLUTIONS OF HYDROXO-
COBALAMIN
Edward J. Hanus, Palisade, N.J., and John W. Carr,
Beverly, Mass., assignors to Merck & Co., Inc., Rahway,
N.J., a corporation of New Jersey
No Drawing. Filed Dec. 5, 1962, Ser. No. 242,363
1 Claim. (Cl. 167—81)

This invention relates to stable aqueous solutions of hydroxocobalamin for parenteral administration. This application is a continuation-in-part of our prior application, Serial No. 36,742, filed June 17, 1960, now abandoned.

Hydroxocobalamin, which is also known as vitamin $B_{12a}$, produces higher blood serum levels than equivalent doses of cyanocobalamin or vitamin $B_{12}$. Hydroxocobalamin in a simple aqueous solution is unstable in the presence of air, however, and this fact has mitigated against its use.

The present invention provides stable aqueous solutions of hydroxocobalamin for the first time. These solutions contain from 5 to 15 mg. per cc. of sodium chloride, preferably about 8.2 mg. per cc., and are buffered to a pH in the range of 3.5 to 6.0, preferably from 4.0 to 4.5. The hydroxocobalamin content is at least .015 mg. per cc. Preferred solutions are high potency solutions containing from about 0.95 to about 1.25 mg. per cc. of hydroxocobalamin. Other ingredients, such as preservatives, may also be present.

The compositions of this invention are intended for parenteral administration, especially by intra-muscular injection, in unit dosages of one cc., for conditions involving vitamin $B_{12}$ deficiency.

It has been found according to this invention that solutions of vitamin $B_{12a}$ possess greater stability when the pH is in the range of 3.5 to 5.0 than when the pH lies outside this range. The greatest stability is possessed by solutions having a pH in the range of 4.0 to 4.5. Accordingly the solutions of this invention are buffered with a mixture of an alkali metal acetate and acetic acid to a pH of 3.5 to 5.0 and preferably 4.0 to 4.5. A preferred buffer is a mixture of sodium acetate and acetic acid. The concentration of the buffering agent can be varied over wide limits with satisfactory results, but it is preferred to have a sodium acetate concentration of about 0.8 to about 1.4 mg. per cc. and an acetic acid concentration of about 1.7 to about 2.7 mg. per cc.

Sodium chloride markedly improves the stability of aqueous solutions of hydroxocobalamin in addition to providing an isotonic solution, when used in the concentration range indicated.

It is frequently desirable to add a preservative in addition to the foregoing ingredients. One preservative which gives very satisfactory results is a mixture of methylparahydroxybenzoate and propylpara-hydroxybenzoate in a weight ratio of 5:1 to 10:1.

Solutions according to the present invention possess markedly greater stability than do simple solutions of hydroxocobalamin, as shown either by an accelerated decomposition test in which the solution is autoclaved at 15 p.s.i.g. and 121° C. for one hour, or by stability tests conducted both at refrigerator temperatures (about 5° C.) and ordinary room temperatures (about 20 to 30° C.) conducted over a period of several months or longer. For example, a solution according to this invention containing 1.05 mg. per cc. of hydroxocobalamin and 8.2 mg. per cc. of sodium chloride, and buffered to a pH of 4.3 with sodium acetate and acetic acid and having an acetate concentration of .05 M, shows a decomposition of 23.5% upon autoclaving for one hour at 15 p.s.i.g. and 121° C. By way of contrast an unbuffered aqueous solution of hydroxocobalamin having the same potency but with no other ingredients in the solution is 38.5% decomposed with a drop in pH from 8.3 to 6.2 under the same conditions.

The stability of solutions according to this invention is enhanced if the hydroxocobalamin solution and surrounding atmosphere are oxygen-free from the time the solution is made until it is used. Purging with a stream of nitrogen gas is the preferred means for removing oxygen both from the solution and from the containers in which the solution is packaged. The solutions of this invention are normally made by combining all of the ingredients except the hydroxocobalamin, purging the solution of air by means of nitrogen gas, adding the hydroxocobalamin and again purging with nitrogen, and subdividing the solution into containers of either unit dosage size (1 cc.) or multiple dosage size (for example, 5 cc., 10 cc., or larger) which have been freed of air by purging with nitrogen prior to filling. It is preferred to maintain a nitrogen atmosphere surrounding the solution during the addition of hydroxocobalamin although the stability is appreciably enhanced even when the hydroxocobalamin is added in an air atmosphere provided the solution is purged with nitrogen both before and after the addition.

In accordance with one mode of preparing the stable solutions of our invention the water used in preparing the solution is boiled and purged with nitrogen until substantially free from dissolved air. The ingredients including the hydroxocobalamin are then added to the water while maintaining a nitrogen atmosphere surrounding the solution. The hydroxocobalamin solution thus prepared is again purged with nitrogen and filtered through a bacterial filter under positive nitrogen pressure. Solutions prepared in this manner are substantially free of dissolved air and may be filled directly into vials without the necessity of purging the vials with nitrogen to remove air.

The superior stability of solutions of this invention is demonstrated both in long term stability tests at either refrigerator temperature (about 5° C.) or ordinary room temperature (about 20° to 30° C.) lasting several months or longer, and in an accelerated decomposition test in which the solution is autoclaved at 15 p.s.i.g. and 121° C. for one hour. For example, a solution prepared according to this invention containing 1.05 mg. per cc. of hydroxocobalamin, 8.2 mg. per cc. of sodium chloride, 1.5 mg. per cc. of methyl p-hydroxybenzoate, and 0.2 mg. per cc. of propyl p-hydroxybenzoate, buffered to pH 4.3 with 0.05 M sodium acetate and 0.05 M acetic acid, purged with nitrogen before and after the addition of hydroxocobalamin, and subdivided into air-free containers, shows a decomposition of only 17.1% when autoclaved for one hour at 15 p.s.i.g. and 121° C. This compares to a 23.5% decomposition of the identical solution when no nitrogen purging is used. By way of contrast, an unbuffered aqueous solution of hydroxocobalamin undergoes a decomposition varying from about 38% to more than 50% when autoclaved for one hour at 15 p.s.i.g. and 121° C.

The invention will now be illustrated in detail with respect to the examples which follow.

EXAMPLE 1

A solution having the following composition was prepared.

| Ingredient: | Amount mg. |
|---|---|
| Hydroxocobalamin | 1.05 |
| Sodium acetate, anhydrous | 1.046 |
| Acetic acid, glacial | 2.190 |
| Methyl p-hydroxybenzoate | 1.500 |
| Propyl p-hydroxybenzoate | 0.200 |
| Sodium chloride | 8.200 |
| Water, pyrogen free, qs. 1.00 cc. | |
| pH 4.0–4.5. | |

This solution was prepared by dissolving the methyl p-hydroxybenzoate and propyl p-hydroxybenzoate in water, adding the sodium acetate, acetic acid, and sodium chloride in that order passing a stream of nitrogen gas through the solution in order to remove the air, dissolving the hydroxocobalamin with agitation, again passing a stream of nitrogen gas through the solution, sterilizing by vacuum filtration through a ceramic bacterial filter.

In an alternate method of sterilization the hydroxocobalamin was sterilized by filtration through a bacterial filter under pressure of nitrogen.

EXAMPLE 2

Nine solutions of hydroxocobalamin were prepared by dissolving in aqueous buffered solutions having a pH of 4.3 the following ingredients:

| | Mg. per cc. |
|---|---|
| Hydroxocobalamin | 1.05 |
| Methyl p-hydroxybenzoate | 1.5 |
| Propyl p-hydroxybenzoate | 0.2 |

Five of the solutions, designated as Solutions 1, 2, 5, 6, and 9, also contained 8.2 mg. per cc. of sodium chloride.

The buffered solution used in preparing Solutions 1 to 4 was obtained by mixing 0.05 M sodium acetate and 0.05 M acetic acid in approximately equal amounts. Solutions of 0.1 M sodium acetate and 0.1 M acetic acid were mixed in about equal amounts to make the buffered solutions used in preparing Solutions 5 to 8. The buffered solution used in preparing Solution 9 was obtained by mixing 0.1 M disodium phosphate and 0.05 M citric acid in the approximate volume ratio of 17 to 23.

Solutions 1, 3, 5, 7, and 9 were prepared by dissolving the methyl p-hydroxybenzoate, the propyl p-hydroxybenzoate, and the sodium chloride where present, in the buffered solution, measuring the pH (virtually no change), bubbling nitrogen through the solution to remove the air dissolved or entrained therein, dissolving the hydroxocobalamin with agitation, again bubbling nitrogen through the solution, and subdividing the solution into glass containers which had been purged of air with nitrogen.

Solutions 2, 4, 6, and 8 were prepared by dissolving the methyl p-hydroxybenzoate, propyl p-hydroxybenzoate, sodium chloride where present, in the buffered solution, measuring the pH (virtually no change), adding the hydroxocobalamin, and subdividing the solution into glass containers. No nitrogen purge was used on either these solutions or the containers.

The stability of solutions according to this invention was compared with the stability of solutions having higher and lower pH. For this purpose the following solutions were prepared:

Buffered solutions having a pH of 3.3 but otherwise identical in composition and method of preparation to Solutions 1, 3, 4, 5, 8, and 9, respectively, were prepared. Also prepared were buffered solutions having a pH of 6.3 but otherwise identical in composition to Solutions 1, 2, 4, 5, and 8, respectively.

The stability of all of the above solutions was determined by autoclaving for one hour at 15 p.s.i.g. and 121° C. The percentage of hydroxocobalamin decomposed in each solution, and all process and composition variables (pH, buffer, presence or absence of sodium chloride, use of nitrogen purge), are indicated in Table I below:

Table I

| Solution | Buffer | NaCl | $N_2$ Purge | Hydroxocobalamin dec., percent | | |
|---|---|---|---|---|---|---|
| | | | | pH 3.3 | pH 4.3 | pH 6.3 |
| 1 | .05 M NaOAc+.05 M HOAc | Present | Yes | 26.9 | 17.1 | 33.1 |
| 2 | .05 M NaOAc+.05 M HOAc | do | No | | 23.5 | |
| 3 | .05 M NaOAc+.05 M HOAc | Absent | Yes | 30.8 | 19.5 | |
| 4 | .05 M NaOAc+.05 M HOAc | do | No | 35.4 | 22.5 | 39.2 |
| 5 | .1 M NaOAc+.1 M HOAc | Present | Yes | 31.3 | 17.5 | 33.5 |
| 6 | .1 M NaOAc+.1 M HOAc | do | No | | 24.0 | |
| 7 | .1 M NaOAc+.1 M HOAc | Absent | Yes | | 26.0 | |
| 8 | .1 M NaOAc+.1 M HOAc | do | No | 46.8 | 40.4 | 38.3 |
| 9 | .1 M $Na_2HPO_4$+.05 M $C_6H_8O_7$ | Present | Yes | 32.1 | 16.0 | |

For purposes of stability comparisons, two unbuffered aqueous solutions containing 1.05 mg. per cc. of hydroxocobalamin were prepared. The first of these was prepared by bubbling nitrogen through the water to remove air, dissolving the hydroxocobalamin, and bubbling nitrogen through the solution. The second solution was made simply by dissolving hydroxocobalamin in water. Upon autoclaving for one hour at 15 p.s.i.g. and 121° C., the hydroxocobalamin decomposition in the first solution was 21 percent, and the decomposition in the second solution, 38.5 percent.

We claim:

A composition of matter comprising, in aqueous solution, from 0.95 to 1.25 mg. per cc. of hydroxocobalamin, from 7.5 to 9.0 mg. per cc. of sodium chloride, from 0.8 to 1.4 mg. per cc. of sodium acetate and from 1.7 to 2.7 mg. per cc. of acetic acid, said solution having a pH in the range of 4.0 to 4.5 and being substantially free from dissolved air.

References Cited in the file of this patent

Lichtman et al.: Proc. Soc. Exptl. Biol. and Med., vol. 72, December 1949, pp. 643–645

Veer et al.: Biochimica et Biophysica Acta, vol. 6 (1950), pp. 225–236.

Mushett et al.: Proc. Soc. Exptl. Biol. and Med., vol. 81, No. 1, October 1952, pp. 234–237.

Macek et al.: J. Pharm. and Pharmacology, 5: 1, January 1953, pp. 74–75.

Gakenheimer: Drug and Cosmetic Industry, 72: 3, March 1953, pp. 320, 321 and 416–421.

Baxter et al.: J. Pharm. and Pharmacology, 5: 10, October 1953, pp. 723–736.